(12) United States Patent
Taylor et al.

(10) Patent No.: US 8,203,933 B2
(45) Date of Patent: Jun. 19, 2012

(54) METHOD AND SYSTEM FOR AUTOMATICALLY IDENTIFYING A LOGICAL CIRCUIT FAILURE IN A DATA NETWORK

(75) Inventors: William Taylor, Duluth, GA (US); David Massengill, Covington, GA (US); John Hollingsworth, Covington, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 944 days.

(21) Appl. No.: 10/745,170

(22) Filed: Dec. 23, 2003

(65) Prior Publication Data
US 2005/0172174 A1   Aug. 4, 2005

(51) Int. Cl.
*G06F 11/00* (2006.01)
(52) U.S. Cl. ........ 370/217; 370/221; 370/242; 370/250; 714/4.1
(58) Field of Classification Search .............. 370/242, 370/244, 250, 216, 217, 218, 219, 221, 389, 370/395.1; 714/4, 43
See application file for complete search history.

(56) References Cited

U.S. PATENT DOCUMENTS

| | | |
|---|---|---|
| 4,905,233 A | 2/1990 | Cain et al. ............ 370/237 |
| 5,016,244 A | 5/1991 | Massey, Jr. et al. |
| 5,065,392 A | 11/1991 | Sibbitt et al. |
| 5,241,534 A | 8/1993 | Omuro et al. |
| 5,265,092 A | 11/1993 | Soloway et al. |
| 5,375,126 A | 12/1994 | Wallace |
| 5,408,461 A | 4/1995 | Uriu et al. |
| 5,539,817 A | 7/1996 | Wilkes |
| 5,544,170 A | 8/1996 | Kasahara |
| 5,548,639 A | 8/1996 | Ogura et al. |
| 5,559,959 A | 9/1996 | Foglar |
| 5,629,938 A | 5/1997 | Cerciello et al. |
| 5,633,859 A | 5/1997 | Jain et al. |
| 5,650,994 A | 7/1997 | Daley |
| 5,754,527 A | 5/1998 | Fujita |
| 5,764,626 A | 6/1998 | VanDervort |
| 5,774,456 A | 6/1998 | Ellebracht et al. |
| 5,812,528 A | 9/1998 | VanDervort |
| 5,832,197 A | 11/1998 | Houji |

(Continued)

OTHER PUBLICATIONS

Chen, Thomas M. and Liu, Steve S., Management and Control Functions in ATM Switching Systems, IEEE Network, Jul./Aug. 1994.*

(Continued)

*Primary Examiner* — Luat Phung
(74) *Attorney, Agent, or Firm* — Hanley, Flight and Zimmerman, LLC

(57) ABSTRACT

For automatically identifying a failure in a logical circuit in a data network without manual intervention, the logical circuit includes one or more logical connections for communicating data in the data network. A network management module periodically requests trap data indicating the status of the logical connections in the logical circuit. After the trap data has been received by the network management module, the trap data is analyzed to determine whether any of the logical connections has failed. If it is determined that a logical connection has failed, the network management module may wait a predetermined time period to determine whether the failed logical connection has been restored. If after the predetermined time period the logical connection has not been restored, then the logical circuit is identified as having failed.

28 Claims, 3 Drawing Sheets

U.S. PATENT DOCUMENTS

| | | | |
|---|---|---|---|
| 5,848,055 A | 12/1998 | Fedyk et al. | |
| 5,856,981 A | 1/1999 | Voelker | |
| 5,894,475 A | 4/1999 | Bruno et al. | |
| 5,926,456 A | 7/1999 | Takano et al. | 370/218 |
| 5,936,939 A | 8/1999 | Des Jardins et al. | |
| 6,028,863 A * | 2/2000 | Sasagawa et al. | 370/399 |
| 6,038,219 A | 3/2000 | Mawhinney et al. | 370/242 |
| 6,091,951 A | 7/2000 | Sturniolo et al. | |
| 6,104,998 A * | 8/2000 | Galand et al. | 704/500 |
| 6,108,300 A | 8/2000 | Coile et al. | |
| 6,108,307 A | 8/2000 | McConnell et al. | |
| 6,118,763 A | 9/2000 | Trumbull | |
| 6,147,998 A | 11/2000 | Kelley et al. | |
| 6,167,025 A * | 12/2000 | Hsing et al. | 370/216 |
| 6,181,675 B1 | 1/2001 | Miyamoto | 370/218 |
| 6,181,679 B1 * | 1/2001 | Ashton et al. | 370/244 |
| 6,185,695 B1 | 2/2001 | Murphy et al. | |
| 6,195,416 B1 * | 2/2001 | DeCaluwe et al. | 379/32.05 |
| 6,259,696 B1 | 7/2001 | Yazaki et al. | |
| 6,269,401 B1 | 7/2001 | Fletcher et al. | |
| 6,311,288 B1 | 10/2001 | Heeren et al. | |
| 6,360,260 B1 * | 3/2002 | Compliment et al. | 709/224 |
| 6,366,581 B1 | 4/2002 | Jepsen | |
| 6,377,548 B1 | 4/2002 | Chuah | 370/233 |
| 6,421,722 B1 | 7/2002 | Bauer et al. | |
| 6,424,629 B1 | 7/2002 | Rubino et al. | |
| 6,449,259 B1 | 9/2002 | Allain et al. | |
| 6,456,306 B1 * | 9/2002 | Chin et al. | 715/810 |
| 6,473,398 B1 * | 10/2002 | Wall et al. | 370/229 |
| 6,535,990 B1 | 3/2003 | Iterum et al. | |
| 6,538,987 B1 | 3/2003 | Cedrone et al. | |
| 6,549,533 B1 | 4/2003 | Campbell | |
| 6,553,015 B1 | 4/2003 | Sato | 370/331 |
| 6,556,659 B1 | 4/2003 | Bowman-Amuah | |
| 6,570,846 B1 | 5/2003 | Ryoo | |
| 6,581,166 B1 * | 6/2003 | Hirst et al. | 714/4 |
| 6,590,899 B1 * | 7/2003 | Thomas et al. | 370/422 |
| 6,594,246 B1 * | 7/2003 | Jorgensen | 370/338 |
| 6,594,268 B1 | 7/2003 | Aukia et al. | 370/400 |
| 6,597,689 B1 | 7/2003 | Chiu et al. | |
| 6,608,831 B1 | 8/2003 | Beckstrom et al. | |
| 6,625,114 B1 | 9/2003 | Hassell | |
| 6,643,254 B1 | 11/2003 | Kajitani et al. | 370/217 |
| 6,687,228 B1 | 2/2004 | Fichou et al. | |
| 6,697,329 B1 | 2/2004 | McAllister et al. | |
| 6,711,125 B1 | 3/2004 | Walrand et al. | |
| 6,716,165 B1 | 4/2004 | Flanders et al. | |
| 6,738,459 B1 | 5/2004 | Johnstone et al. | |
| 6,763,476 B1 | 7/2004 | Dangi et al. | |
| 6,766,113 B1 | 7/2004 | Al-Salameh et al. | |
| 6,778,525 B1 | 8/2004 | Baum et al. | |
| 6,781,952 B2 | 8/2004 | Shirakawa | |
| 6,795,393 B1 | 9/2004 | Mazzurco et al. | |
| 6,795,394 B1 | 9/2004 | Swinkels et al. | |
| 6,810,043 B1 | 10/2004 | Naven et al. | |
| 6,823,477 B1 | 11/2004 | Cheng et al. | |
| 6,826,184 B1 | 11/2004 | Bryenton et al. | 370/395.1 |
| 6,829,223 B1 | 12/2004 | Richardson et al. | |
| 6,842,513 B1 | 1/2005 | Androski et al. | |
| 6,850,483 B1 | 2/2005 | Semaan | |
| 6,862,351 B2 * | 3/2005 | Taylor | 379/221.06 |
| 6,865,170 B1 * | 3/2005 | Zendle | 370/338 |
| 6,882,652 B1 | 4/2005 | Scholtens et al. | |
| 6,885,678 B2 | 4/2005 | Curry et al. | |
| 6,925,578 B2 | 8/2005 | Lam et al. | |
| 6,952,395 B1 | 10/2005 | Manoharan et al. | |
| 6,973,034 B1 * | 12/2005 | Natarajan et al. | 370/232 |
| 6,973,037 B1 | 12/2005 | Kahveci | |
| 6,978,394 B1 | 12/2005 | Charny et al. | |
| 6,981,039 B2 | 12/2005 | Cerami et al. | |
| 6,983,401 B2 * | 1/2006 | Taylor | 714/45 |
| 6,990,616 B1 | 1/2006 | Botton-Dascal et al. | |
| 7,006,443 B2 | 2/2006 | Storr | |
| 7,012,898 B1 | 3/2006 | Farris et al. | |
| 7,027,053 B2 | 4/2006 | Berndt et al. | |
| 7,035,202 B2 | 4/2006 | Callon | |
| 7,043,250 B1 | 5/2006 | DeMartino | |
| 7,072,331 B2 | 7/2006 | Liu et al. | |
| 7,093,155 B2 | 8/2006 | Aoki | |
| 7,120,148 B1 | 10/2006 | Batz et al. | |
| 7,120,819 B1 * | 10/2006 | Gurer et al. | 714/4 |
| 7,146,000 B2 | 12/2006 | Hollman et al. | |
| 7,165,192 B1 * | 1/2007 | Cadieux et al. | 714/43 |
| 7,184,439 B1 | 2/2007 | Aubuchon et al. | |
| 7,200,148 B1 * | 4/2007 | Taylor et al. | 370/395.1 |
| 7,209,452 B2 * | 4/2007 | Taylor et al. | 370/241 |
| 7,240,364 B1 * | 7/2007 | Branscomb et al. | 726/9 |
| 7,275,192 B2 | 9/2007 | Taylor et al. | |
| 7,287,083 B1 | 10/2007 | Nay et al. | |
| 7,350,099 B2 | 3/2008 | Taylor et al. | |
| 7,391,734 B2 | 6/2008 | Taylor et al. | |
| 7,457,233 B1 | 11/2008 | Gan et al. | |
| 7,460,468 B2 | 12/2008 | Taylor et al. | |
| 7,466,646 B2 | 12/2008 | Taylor et al. | |
| 7,469,282 B2 | 12/2008 | Taylor et al. | |
| 7,483,370 B1 | 1/2009 | Dayal et al. | |
| 7,609,623 B2 | 10/2009 | Taylor et al. | |
| 7,630,302 B2 | 12/2009 | Taylor et al. | |
| 7,639,606 B2 | 12/2009 | Taylor et al. | |
| 7,639,623 B2 | 12/2009 | Taylor et al. | |
| 7,646,707 B2 | 1/2010 | Taylor et al. | |
| 7,768,904 B2 | 8/2010 | Taylor et al. | |
| 8,031,588 B2 | 10/2011 | Taylor et al. | |
| 8,031,620 B2 | 10/2011 | Taylor et al. | |
| 2001/0000700 A1 * | 5/2001 | Eslambolchi et al. | 370/217 |
| 2001/0010681 A1 | 8/2001 | McAllister et al. | |
| 2002/0001307 A1 | 1/2002 | Nguyen et al. | |
| 2002/0072358 A1 | 6/2002 | Schneider et al. | |
| 2002/0089985 A1 | 7/2002 | Wahl et al. | 370/395 |
| 2002/0112072 A1 | 8/2002 | Jain | |
| 2002/0131362 A1 | 9/2002 | Callon | |
| 2002/0172148 A1 | 11/2002 | Kim et al. | |
| 2002/0181402 A1 | 12/2002 | Lemoff et al. | |
| 2003/0043753 A1 | 3/2003 | Nelson et al. | |
| 2003/0051049 A1 | 3/2003 | Noy et al. | |
| 2003/0051195 A1 * | 3/2003 | Bosa et al. | 714/43 |
| 2003/0086413 A1 | 5/2003 | Tartarelli et al. | |
| 2003/0091024 A1 | 5/2003 | Stumer | 370/352 |
| 2003/0092390 A1 | 5/2003 | Haumont | |
| 2003/0117951 A1 | 6/2003 | Wiebe et al. | |
| 2003/0128692 A1 | 7/2003 | Mitsumori et al. | |
| 2003/0152028 A1 | 8/2003 | Raisanen et al. | |
| 2003/0185151 A1 | 10/2003 | Kurosawa et al. | |
| 2004/0090918 A1 | 5/2004 | McLendon | |
| 2004/0090973 A1 | 5/2004 | Christie et al. | 370/401 |
| 2004/0125776 A1 | 7/2004 | Haugli et al. | |
| 2004/0141464 A1 * | 7/2004 | Taylor et al. | 370/241 |
| 2004/0172574 A1 | 9/2004 | Wing et al. | |
| 2004/0202112 A1 | 10/2004 | McAllister et al. | |
| 2005/0002339 A1 * | 1/2005 | Patil et al. | 370/237 |
| 2005/0013242 A1 | 1/2005 | Chen et al. | 370/228 |
| 2005/0135237 A1 * | 6/2005 | Taylor et al. | 370/228 |
| 2005/0135238 A1 * | 6/2005 | Taylor et al. | 370/228 |
| 2005/0135254 A1 * | 6/2005 | Taylor et al. | 370/237 |
| 2005/0135263 A1 * | 6/2005 | Taylor et al. | 370/244 |
| 2005/0138203 A1 * | 6/2005 | Taylor et al. | 709/239 |
| 2005/0138476 A1 * | 6/2005 | Taylor et al. | 714/37 |
| 2005/0172160 A1 * | 8/2005 | Taylor et al. | 714/4 |
| 2005/0172174 A1 | 8/2005 | Taylor et al. | |
| 2005/0237925 A1 * | 10/2005 | Taylor et al. | 370/216 |
| 2005/0238006 A1 | 10/2005 | Taylor et al. | |
| 2005/0238007 A1 * | 10/2005 | Taylor et al. | 370/389 |
| 2005/0238024 A1 | 10/2005 | Taylor et al. | |
| 2005/0240840 A1 * | 10/2005 | Taylor et al. | 714/724 |
| 2005/0276216 A1 | 12/2005 | Vasseur et al. | |
| 2006/0013210 A1 | 1/2006 | Bordogna et al. | |
| 2006/0146700 A1 | 7/2006 | Taylor et al. | |
| 2006/0153066 A1 | 7/2006 | Saleh et al. | |
| 2007/0050492 A1 | 3/2007 | Jorgensen | |
| 2007/0168200 A1 | 7/2007 | Shimizu | |
| 2009/0041012 A1 | 2/2009 | Taylor et al. | |
| 2009/0086626 A1 | 4/2009 | Taylor et al. | |
| 2009/0103544 A1 | 4/2009 | Taylor et al. | |
| 2009/0323534 A1 | 12/2009 | Taylor et al. | |
| 2010/0020677 A1 | 1/2010 | Taylor et al. | |

| | | |
|---|---|---|
| 2010/0046366 A1 | 2/2010 | Taylor et al. |
| 2010/0046380 A1 | 2/2010 | Taylor et al. |
| 2010/0054122 A1 | 3/2010 | Taylor et al. |

OTHER PUBLICATIONS

Meserole, Thomas A. and Prasad, Anil, Customer Network Management (CNM) for ATM Public Network Service (M3 Specification), af-nm-0019.000, Rev. 1.04, Oct. 1994.*

Mangan, Tim, OA&M: How a Frame Relay SLA is Measured and Diagnosed, http://www.mfaforum.org/frame/VVhitepaper/whitepapers/OAMwhitepaper.shtml.*

Official Action dated Oct. 2, 2006, in U.S. Appl. No. 10/744,281.
Official Action dated Apr. 17, 2007, in U.S. Appl. No. 10/744,281.
Official Action dated Jul. 20, 2007, in U.S. Appl. No. 10/744,283.
Official Action dated Aug. 6, 2007, in U.S. Appl. No. 10/744,555.
Official Action dated Aug. 7, 2007, in U.S. Appl. No. 10/745,116.
Official Action dated Aug. 8, 2007, in U.S. Appl. No. 10/745,117.
Official Action dated Aug. 8, 2007, in U.S. Appl. No. 10/744,921.
Official Action dated Aug. 8, 2007, in U.S. Appl. No. 10/745,168.
Meserole, Thomas A. and Prasad, Anil Customer Network Management (CNM) for ATM Public Network Service (M3 Specification), af-nm-0019.000, Rev. 1.04, Oct. 1994.
Mangan, Tim, OA&M: How a Frame Relay SLA is Measured and Diagnosed, http://www.mfaforum.org/frame/Whitepaper/whitepapers/OAMwhitepaper.shtml.
Official Action dated Apr. 28, 2008, in U.S. Appl. No. 10/745,116.
Official Action dated May 1, 2008, in U.S. Appl. No. 10/744,921.
Official Action dated May 2, 2008, in U.S. Appl. No. 10/745,168.
Official Action dated May 12, 2008, in U.S. Appl. No. 10/745,117.
Official Action dated May 12, 2008, in U.S. Appl. No. 10/744,555.
Official Action dated Jun. 12, 2008, in U.S. Appl. No. 10/745,047.
U.S. Official Action dated Apr. 17, 2008 in U.S. Appl. No. 10/744,283.
U.S. Official Action dated Apr. 17, 2008 in U.S. Appl. No. 10/745,117.
Don Ryan, The Telco Handbook for New Technicians—An Introduction to Telco Technology and Troubleshooting, Oct. 27, 2000, [retrieved from http://www.darkwing.net/aaron/telco.doc, accessed on Nov. 11, 2006], 67 pages.
Official Action dated May 15, 2006, in U.S. Appl. No. 10/829,509 (11 pages).
Official Action dated Nov. 13, 2006, in U.S. Appl. No. 10/829,509 (12 pages).
Official Action dated Jan. 4, 2007, in U.S. Appl. No. 10/348,077 (16 pages).
Official Action dated Aug. 10, 2007, in U.S. Appl. No. 10/348,077 (26 pages).
Official Action dated Sep. 7, 2007, in U.S. Appl. No. 10/829,495 (23 pages).
Official Action dated Sep. 10, 2007, in U.S. Appl. No. 10/829,795 (21 pages).
Official Action dated Sep. 19, 2007, in U.S. Appl. No. 10/829,584 (15 pages).
Official Action dated Oct. 17, 2007, in U.S. Appl. No. 10/829,539 (19 pages).
Official Action dated Apr. 30, 2008, in U.S. Appl. No. 10/829,795 (20 pages).
Official Action dated Jun. 11, 2008, in U.S. Appl. No. 10/829,495 (22 pages).
Official Action dated Jun. 25, 2008, in U.S. Appl. No. 10/829,584 (20 pages).
Official Action dated Aug. 20, 2008, in U.S. Appl. No. 10/829,539 (29 pages).
Official Action dated Oct. 29, 2008, in U.S. Appl. No. 10/829,495 (25 pages).
Official Action dated Oct. 30, 2008, in U.S. Appl. No. 10/744,283 (13 pages).
Official Action dated Oct. 31, 2008, in U.S. Appl. No. 10/744,921 (25 pages).
Official Action dated Nov. 25, 2008, in U.S. Appl. No. 10/829,539 (23 pages).
Official Action dated Nov. 26, 2008, in U.S. Appl. No. 10/745,117 (21 pages).
Official Action dated Dec. 2, 2008, in U.S. Appl. No. 10/745,168 (25 pages).
Official Action dated Jan. 14, 2009, in U.S. Appl. No. 10/744,555 (37 pages).
United States Patent and Trademark Office, "Interview Summary," issued in connection with U.S. Appl. No. 10/348,077, on May 11, 2007 (2 pages).
United States Patent and Trademark Office, "Notice of Allowance," issued in connection with U.S. Appl. No. 10/348,077, on Apr. 29, 2008 (10 pages).
United States Patent and Trademark Office, "Notice of Allowance," issued in connection with U.S. Appl. No. 10/348,592, on Oct. 14, 2008 (4 pages).
United States Patent and Trademark Office, "Final Office Action," issued in connection with U.S. Appl. No. 10/348,592, on Mar. 21, 2008 (11 pages).
United States Patent and Trademark Office, "Non-Final Office Action," issued in connection with U.S. Appl. No. 10/348,592, on Jun. 14, 2007 (10 pages).
United States Patent and Trademark Office, "Non-Final Office Action," issued in connection with U.S. Appl. No. 10/348,592, on Sep. 8, 2006 (7 pages).
United States Patent and Trademark Office, "Notice of Allowance," issued in connection with U.S. Appl. No. 10/744,281, on Oct. 30, 2007 (8 pages).
United States Patent and Trademark Office, "Notice of Allowance," issued in connection with U.S. Appl. No. 10/744,281, on Aug. 27, 2007 (6 pages).
United States Patent and Trademark Office, "Interview Summary," issued in connection with U.S. Appl. No. 10/744,281, on Aug. 6, 2007 (3 pages).
United States Patent and Trademark Office, "Interview Summary," issued in connection with U.S. Appl. No. 10/744,281, on Nov. 27, 2006 (3 pages).
United States Patent and Trademark Office, "Non-Final Office Action," issued in connection with U.S. Appl. No. 10/744,283, on Apr. 14, 2009 (13 pages).
United States Patent and Trademark Office, "Final Office Action," issued in connection with U.S. Appl. No. 10/744,555, on Jul. 17, 2009 (27 pages).
United States Patent and Trademark Office, "Final Office Action," issued in connection with U.S. Appl. No. 10/744,921, on Apr. 6, 2009 (23 pages).
United States Patent and Trademark Office, "Non-Final Office Action," issued in connection with U.S. Appl. No. 10/744,921, on Jul. 9, 2009 (24 pages).
United States Patent and Trademark Office, "Final Office Action," issued in connection with U.S. Appl. No. 10/745,047, on Mar. 27, 2009 (18 pages).
United States Patent and Trademark Office, "Notice of Allowance," issued in connection with U.S. Appl. No. 10/745,116, on May 7, 2009 (17 pages).
United States Patent and Trademark Office, "Notice of Allowance," issued in connection with U.S. Appl. No. 10/745,116, on Dec. 3, 2008 (8 pages).
United States Patent and Trademark Office, "Notice of Allowance," issued in connection with U.S. Appl. No. 10/745,117, on May 14, 2009 (31 pages).
United States Patent and Trademark Office, "Supplemental Notice of Allowance," issued in connection with U.S. Appl. No. 10/745,117, on Jun. 15, 2009 (4 pages).
United States Patent and Trademark Office, "Notice of Allowance," issued in connection with U.S. Appl. No. 10/745,168, on Jun. 12, 2009 (22 pages).
United States Patent and Trademark Office, "Final Office Action," issued in connection with U.S. Appl. No. 10/829,495, on Mar. 23, 2009 (26 pages).
United States Patent and Trademark Office, "Advisory Action," issued in connection with U.S. Appl. No. 10/829,495, on Jun. 4, 2009 (3 pages).

United States Patent and Trademark Office, "Interview Summary," issued in connection with U.S. Appl. No. 10/829,509, on Sep. 20, 2006 (4 pages).

United States Patent and Trademark Office, "Notice of Allowance," issued in connection with U.S. Appl. No. 10/829,509, on Jul. 10, 2007 (7 pages).

United States Patent and Trademark Office, "Notice of Allowance," issued in connection with U.S. Appl. No. 10/829,509, on Feb. 1, 2007 (8 pages).

United States Patent and Trademark Office, "Final Office Action," issued in connection with U.S. Appl. No. 10/829,539, on Mar. 13, 2009 (29 pages).

United States Patent and Trademark Office, "Interview Summary," issued in connection with U.S. Appl. No. 10/829,539, on Apr. 28, 2008 (2 pages).

United States Patent and Trademark Office, "Advisory Action," issued in connection with U.S. Appl. No. 10/829,539, on Jun. 12, 2009 (3 pages).

United States Patent and Trademark Office, "Office Communication—No Action Count," issued in connection with U.S. Appl. No. 10/829,584, on Oct. 16, 2008 (4 pages).

United States Patent and Trademark Office, "Notice of Allowance," issued in connection with U.S. Appl. No. 10/829,584, on Sep. 22, 2008 (7 pages).

United States Patent and Trademark Office, "Supplemental Notice of Allowance," issued in connection with U.S. Appl. No. 10/829,795, on Nov. 13, 2008 (2 pages).

United States Patent and Trademark Office, "Notice of Allowance," issued in connection with U.S. Appl. No. 10/829,795, on Sep. 9, 2008 (7 pages).

United States Patent and Trademark Office, "Interview Summary," issued in connection with U.S. Appl. No. 10/829,795, on Aug. 1, 2008 (2 pages).

United States Patent and Trademark Office, "Notice of Allowance," issued in connection with U.S. Appl. No. 10/745,047, on Jul. 23, 2009 (7 pages).

United States Patent and Trademark Office, "Notice of Allowance," issued in connection with U.S. Appl. No. 10/745,116, on Aug. 14, 2009 (7 pages).

United States Patent and Trademark Office, "Notice of Allowance," issued in connection with U.S. Appl. No. 10/745,168, on Aug. 7, 2009 (7 pages).

United States Patent and Trademark Office, "Notice of Allowance," issued in connection with U.S. Appl. No. 10/745,117, on Aug. 27, 2009 (7 pages).

United States Patent and Trademark Office, "Non-Final Office Action," issued in connection with U.S. Appl. No. 10/829,539, on Aug. 25, 2009 (41 pages).

United States Patent and Trademark Office, "Notice of Allowance," issued in connection with U.S. Appl. No. 10/744,283, on Sep. 18, 2009 (11 pages).

United States Patent and Trademark Office, "Non-Final Office Action," issued in connection with U.S. Appl. No. 10/744,555, on Feb. 1, 2010 (26 pages).

United States Patent and Trademark Office, "Non-Final Office Action," issued in connection with U.S. Appl. No. 10/829,495, on Oct. 1, 2009 (28 pages).

United States Patent and Trademark Office, "Final Office Action," issued in connection with U.S. Appl. No. 10/744,921, on Mar. 3, 2010 (23 pages).

United States Patent and Trademark Office, "Non-Final Office Action," issued in connection with U.S. Appl. No. 10/829,539, on Apr. 27, 2010 (32 pages).

United States Patent and Trademark Office, "Non-Final Office Action," issued in connection with U.S. Appl. No. 12/254,233, on Apr. 15, 2010 (24 pages).

United States Patent and Trademark Office, "Non-Final Office Action," issued in connection with U.S. Appl. No. 12/334,248, on Apr. 13, 2010 (23 pages).

United States Patent and Trademark Office, "Non-Final Office Action," issued in connection with U.S. Appl. No. 12/339,426, on Mar. 8, 2010 (6 pages).

United States Patent and Trademark Office, "Notice of Allowance," issued in connection with U.S. Appl. No. 10/829,495, on Apr. 29, 2010 (7 pages).

United States Patent and Trademark Office, "Final Office Action," issued in connection with U.S. Appl. No. 10/744,555, on Oct. 7, 2010 (26 pages).

United States Patent and Trademark Office, "Final Office Action," issued in connection with U.S. Appl. No. 10/829,539, on Sep. 23, 2010 (32 pages).

United States Patent and Trademark Office, "Final Office Action," issued in connection with U.S. Appl. No. 12/334,248, on Sep. 29, 2010 (25 pages).

United States Patent and Trademark Office, "Final Office Action," issued in connection with U.S. Appl. No. 12/254,233, on Sep. 29, 2010 (26 pages).

United States Patent and Trademark Office, "Notice of Allowance," issued in connection with U.S. Appl. No. 12/339,426, on Nov. 8, 2010 (9 pages).

United States Patent and Trademark Office, "Non-Final Office Action," issued in connection with U.S. Appl. No. 12/551,477, on Nov. 16, 2010 (15 pages).

United States Patent and Trademark Office, "Non-Final Office Action," issued in connection with U.S. Appl. No. 12/570,938, on Oct. 7, 2010 (19 pages).

United States Patent and Trademark Office, "Non-Final Office Action," issued in connection with U.S. Appl. No. 12/609,683, on Oct. 25, 2010 (15 pages).

United States Patent and Trademark Office, "Notice of Panel Decision from Pre-Appeal Brief Review," issued in connection with U.S. Appl. No. 10/744,921, on Sep. 7, 2010 (2 pages).

United States Patent and Trademark Office, "Non-Final Office Action," issued in connection with U.S. Appl. No. 10/744,555, on Apr. 14, 2011 (19 pages).

United States Patent and Trademark Office, "Non-Final Office Action," issued in connection with U.S. Appl. No. 10/744,921, on May 11, 2011 (20 pages).

United States Patent and Trademark Office, "Non-Final Office Action," issued in connection with U.S. Appl. No. 10/829,539, on Mar. 22, 2011 (35 pages).

United States Patent and Trademark Office, "Final Office Action," issued in connection with U.S. Appl. No. 10/829,539, on Sep. 29, 2011 (37 pages).

United States Patent and Trademark Office, "Non-Final Office Action," issued in connection with U.S. Appl. No. 12/254,233, on Mar. 25, 2011 (28 pages).

United States Patent and Trademark Office, "Final Office Action," issued in connection with U.S. Appl. No. 12/254,233, on Oct. 3, 2011 (29 pages).

United States Patent and Trademark Office, "Non-Final Office Action," issued in connection with U.S. Appl. No. 12/334,248, on Mar. 25, 2011 (28 pages).

United States Patent and Trademark Office, "Final Office Action," issued in connection with U.S. Appl. No. 12/334,248, on Oct. 3, 2011 (29 pages).

United States Patent and Trademark Office, "Final Office Action," issued in connection with U.S. Appl. No. 12/551,477, on Jul. 11, 2011 (13 pages).

United States Patent and Trademark Office, "Notice of Panel Decision from Pre-Appeal Brief Review," issued in connection with U.S. Appl. No. 12/551,477, on Jan. 13, 2012 (2 pages).

United States Patent and Trademark Office, "Notice of Allowance," issued in connection with U.S. Appl. No. 12/570,938, on Jun. 20, 2011 (14 pages).

United States Patent and Trademark Office, "Non-Final Office Action," issued in connection with U.S. Appl. No. 12/609,415, on Dec. 9, 2010 (12 pages).

United States Patent and Trademark Office, "Non-Final Office Action," issued in connection with U.S. Appl. No. 12/609,415, on Jun. 23, 2011 (12 pages).

United States Patent and Trademark Office, "Non-Final Office Action," issued in connection with U.S. Appl. No. 12/609,640, on Dec. 9, 2010 (11 pages).

United States Patent and Trademark Office, "Notice of Allowance," issued in connection with U.S. Appl. No. 12/609,683, on Jul. 12, 2011 (24 pages).

United States Patent and Trademark Office, "Non-Final Office Action," issued in connection with U.S. Appl. No. 12/967,930, on Apr. 29, 2011 (6 pages).

United States Patent and Trademark Office, "Non-Final Office Action," issued in connection with U.S. Appl. No. 10/829,539, on Jan. 30, 2012 (37 pages).

United States Patent and Trademark Office, "Non-Final Office Action," issued in connection with U.S. Appl. No. 12/254,233, on Jan. 30, 2012 (29 pages).

United States Patent and Trademark Office, "Non-Final Office Action," issued in connection with U.S. Appl. No. 12/334,248, on Jan. 30, 2012 (29 pages).

United States Patent and Trademark Office, "Notice of Allowance," issued in connection with U.S. Appl. No. 12/967,930, on Jan. 30, 2012 (13 pages).

United States Patent and Trademark Office, "Notice of Allowance," issued in connection with U.S. Appl. No. 10/744,555, on Feb. 6, 2012. (8 pages).

United States Patent and Trademark Office, "Notice of Allowance," issued in connection with U.S. Appl. No. 12/551,477, on Mar. 1, 2012 (8 pages).

United States Patent and Trademark Office, "Non-Final Office Action," issued in connection with U.S. Appl. No. 12/609,415, on Mar. 7, 2012 (12 pages).

United States Patent and Trademark Office, "Notice of Allowance," issued in connection with U.S. Appl. No. 10/744,921, on Apr. 23, 2012 (19 pages).

* cited by examiner

METHOD AND SYSTEM FOR AUTOMATICALLY IDENTIFYING A LOGICAL CIRCUIT FAILURE IN A DATA NETWORK

CROSS-REFERENCE TO RELATED APPLICATIONS

The present application is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to and filed concurrently with U.S. patent application Ser. No. 10/745,117, entitled "Method And System For Providing A Failover Circuit For Rerouting Logical Circuit Data In A Data Network," filed on Dec. 23, 2003, U.S. patent application Ser. No. 10/744,281, entitled "Method And System For Utilizing A Logical Failover Circuit For Rerouting Data Between Data Networks," filed on Dec. 23, 2003, U.S. patent application Ser. No. 10/745,047, entitled "Method And System For Automatically Renaming Logical Circuit Identifiers For Rerouted Logical Circuits In A Data Network," filed on Dec. 23, 2003, U.S. patent application Ser. No. 10/744,921, entitled "Method And System For Automatically Rerouting Logical Circuit Data In A Data Network," filed on Dec. 23, 2003, U.S. patent application Ser. No. 10/745,168, entitled "Method And System For Automatically Rerouting Logical Circuit Data In A Virtual Private Network," filed on Dec. 23, 2003, U.S. patent application Ser. No. 10/745,116, entitled "Method And System For Automatically Rerouting Data From An Overbalanced Logical Circuit In A Data Network," filed on Dec. 23, 2003, U.S. patent application Ser. No. 10/744,283, entitled "Method And System For Real Time Simultaneous Monitoring Of Logical Circuits In A Data Network," filed on Dec. 23, 2003, U.S. patent application Ser. No. 10/744,555, entitled "Method And System For Prioritized Rerouting Of Logical Circuit Data In A Data Network," filed on Dec. 23, 2003. All of the above-referenced applications are assigned to the same assignee as the present application and are expressly incorporated herein by reference.

TECHNICAL FIELD

The present invention relates to the routing of data using logical circuits in a data network. More particularly, the present invention is related to automatically identifying a failure in a logical circuit in a data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host location is delivered to the network through a physical circuit such as a T1 line that links to a switch of the network. The remote device that communicates with the host through the network also has a physical circuit to a switch of the network. The communication path between the switches associated with the host and the remote device that passes through the network is a logical circuit.

In frame relay and ATM networks, end devices do not select different routes for data packets or cells sent between the host and the remote location, but always send the data packets or cells through the same path. A host device may have many logical circuits, such as permanent virtual circuits ("PVCs") or switched virtual circuits ("SVCs"), linked to many remote locations. For example, a PVC sends and receives data packets or cells through the same path leading to the switch of the remote device's physical connection.

In large-scale networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs").

Periodically, failures may occur to the trunk circuits or the NNIs of network circuits in large-scale networks causing lost data. Currently, such network circuit failures are handled by dispatching technicians on each end of the network circuit (i.e., in each LATA) in response to a reported failure. The technicians manually access a logical element module to troubleshoot the logical circuit portion of the network circuit. The logical element module communicates with the switches in the data network and provides the technician with the status of the logical connections which make up the logical circuit. Once the technician determines the status of a logical connection at one end of a logical circuit (e.g., the host end), the technician then must access a network database to determine the location of the other end of the logical circuit so that its status may also be ascertained. If the technician determines the logical circuit is operating properly, the technician then accesses a physical element module to troubleshoot the physical circuit portion of the network circuit to determine the cause of the failure and then repair it.

Current methods of determining network circuit failures, however, suffer from several drawbacks. One drawback is that troubleshooting the logical and physical circuits is time consuming and results in dropped data packets or cells until the failure is isolated and repaired. For example, isolating a logical circuit failure requires that a technician access a database to identify the logical connections which make up the logical circuit. Once the logical connections are identified, their status is ascertained and the logical circuit is repaired. The database records, however, are manually entered and thus subject to human error which, if present, increases circuit downtime until the logical connections making up the failed logical circuit are identified. Furthermore troubleshooting the physical circuit often requires taking the network circuit out of service to perform testing, thus increasing the downtime and loss of data in the network circuit.

It is with respect to these considerations and others that the present invention has been made.

SUMMARY OF THE INVENTION

In accordance with the present invention, the above and other problems are solved by methods for automatically identifying a logical circuit failure in a data network. According to one method, a logical circuit in the data network is periodically monitored for status information pertinent to the logical circuit. The data network may be a frame relay network or an asynchronous transfer mode ("ATM") network. The logical circuit may include one more logical connections for communicating data in the data network. The logical circuit may be a permanent virtual circuit ("PVC") or a switched virtual circuit ("SVC"). A failure of the logical circuit is then identified, based on the status information, without manual intervention.

The periodic monitoring of the logical circuit may include periodically monitoring one or more logical connections in the logical circuit. The periodic monitoring of the logical connections in the logical circuit may include periodically requesting trap data for each logical connection. The trap data may include status information for each logical connection in the logical circuit. Identifying a failure of the logical circuit may include analyzing the status information for the each logical connection. If the status information for the at least one logical connection indicates that a logical connection is no longer communicating data, then determining that the logical connection has failed. After determining that the logical connection has failed, waiting a predetermined time period to determine whether the failed logical connection has been restored. If after the predetermined time period, the logical connection has not been restored, then determining that the logical circuit has failed.

The method may further include identifying a logical identifier for the logical circuit and based on the logical identifier, accessing a database to identify each logical connection in the logical circuit. The logical identifier may be a data link connection identifier ("DLCI") or a virtual path/virtual circuit identifier ("VPI/VCI"). Each logical connection may include a network-to-network interface.

In accordance with other aspects, the present invention relates to a system for automatically identifying a logical circuit failure in a data network. The system includes a network device for collecting trap data for the logical circuit in the data network, a logical element module in communication with the network device for receiving the trap data for the logical circuit, and a network management module in communication with the logical element module. The network management module is utilized to periodically retrieving the trap data for the logical circuit and identify a failure of the logical circuit based on the trap data, without manual intervention.

These and various other features as well as advantages, which characterize the present invention, will be apparent from a reading of the following detailed description and a review of the associated drawings.

DETAILED DESCRIPTION OF THE INVENTION

Figure 1:
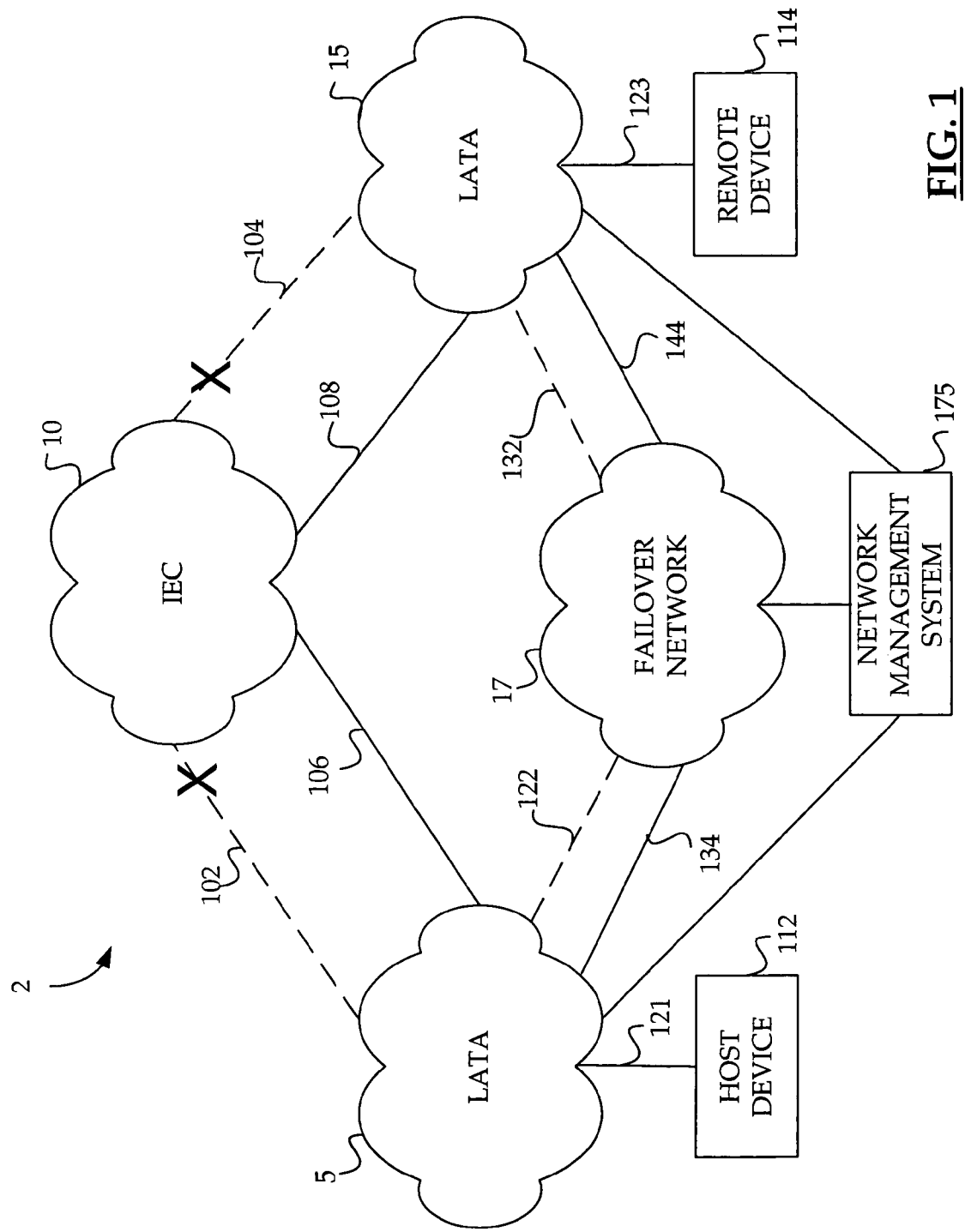
FIG. 1 illustrates an illustrative data network according to an embodiment of the invention.

Embodiments of the present invention provide for a method and system automatically identifying a failure in a logical circuit in a data network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a data network 2 as shown in FIG. 1. The data network 2 includes local access and transport areas ("LATAs") 5 and 15 which are connected by an Inter-Exchange Carrier ("IEC") 10. It should be understood that the LATAs 5 and 15 may be operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes a network circuit which channels data between a host device 112 and a remote device 114 through the LATA 5, the IEC 10, and the LATA 15. It will be appreciated by those skilled in the art that the host and remote devices 112 and 114 may be local area network ("LAN") routers, LAN bridges, hosts, front end processors, Frame Relay Access Devices ("FRADs"), or any other device with a frame relay, ATM, or network interface. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5 and 15 and the IEC 10 may further include one or more interconnected network elements, such as switches (not shown), for transmitting data.

The network circuit between the host device 112 and the remote device 114 in the data network 2 includes a physical circuit and a logical circuit. As used in the foregoing description and the appended claims, a physical circuit is defined as the physical path that connects the end point of a network circuit to a network device. For example, the physical circuit of the network circuit between the host device 112 and the remote device 114 includes the physical connection 121 between the host device 112 and the LATA 5, the physical connection 106 between the LATA 5 and the IEC 10, the physical connection 108 between the IEC 10 and the LATA 15, and the physical connection 123 between the LATA 15 and the remote device 114. Routers and switches within the LATAs 5 and 15 and the IEC 10 carry the physical signal between the host and remote end devices 112 and 114 through the physical circuit.

It should be understood that the host and remote devices may be connected to the physical circuit described above using user-to-network interfaces ("UNIs"). As is known to those skilled in the art, an UNI is the physical demarcation point between a user device (e.g, a host device) and a public data network. It will further be understood by those skilled in the art that the physical connections 106 and 108 may include trunk circuits for carrying the data between the LATAs 5 and 15 and the IEC 10. It will be further understood by those skilled in the art that the connections 121 and 123 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices in a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the data network 2 may include a variable communication path within the LATA 5 and a fixed communication path (i.e., the logical connection 102) between the LATA 5 and the IEC 10. It will be understood by those skilled in the art that the logical connections 102 and 104 in the data network 2 may include network-to-network interfaces ("NNIs") between the last sending switch in a LATA and the first receiving switch in an IEC.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame and service parameters for handling network congestion. For example, in the data network 2 implemented as a frame relay network, the designation DLCI 100 may be used to identify the logical circuit between the host device 112 and the remote device 114. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify the logical circuit in the LATA 5 and LATA 15 but the designation DLCI 800 may identify the logical circuit in the IEC 10.

Illustrative service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination and specific bits which may indicate, for example, the existence of congestion in the network and a threshold for discarding cells.

It should be understood that the logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated that the data communicated over the logical connections 102 and 104 may be physically carried by the physical connections 106 and 108.

The data network 2 may also include a failover network 17 for rerouting logical circuit data, according to an embodiment of the invention. The failover network 17 may include a network failover circuit including physical connections 134 and 144 and logical connections 122 and 132 for rerouting logical circuit data in the event of a failure in the network circuit between the host device 112 and the remote device 114. The data network 2 may also include a network management system 175 in communication with the LATA 5 and the LATA 15 which may be utilized to obtain status information for the logical and physical circuit between the host device 112 and the remote device 114. The network management system 175 may also be utilized for rerouting logical data in the data network 2 between the host device 112 and the remote device 114. The network management module 176 will be discussed in greater detail in the description of FIG. 2 below.

Figure 2:
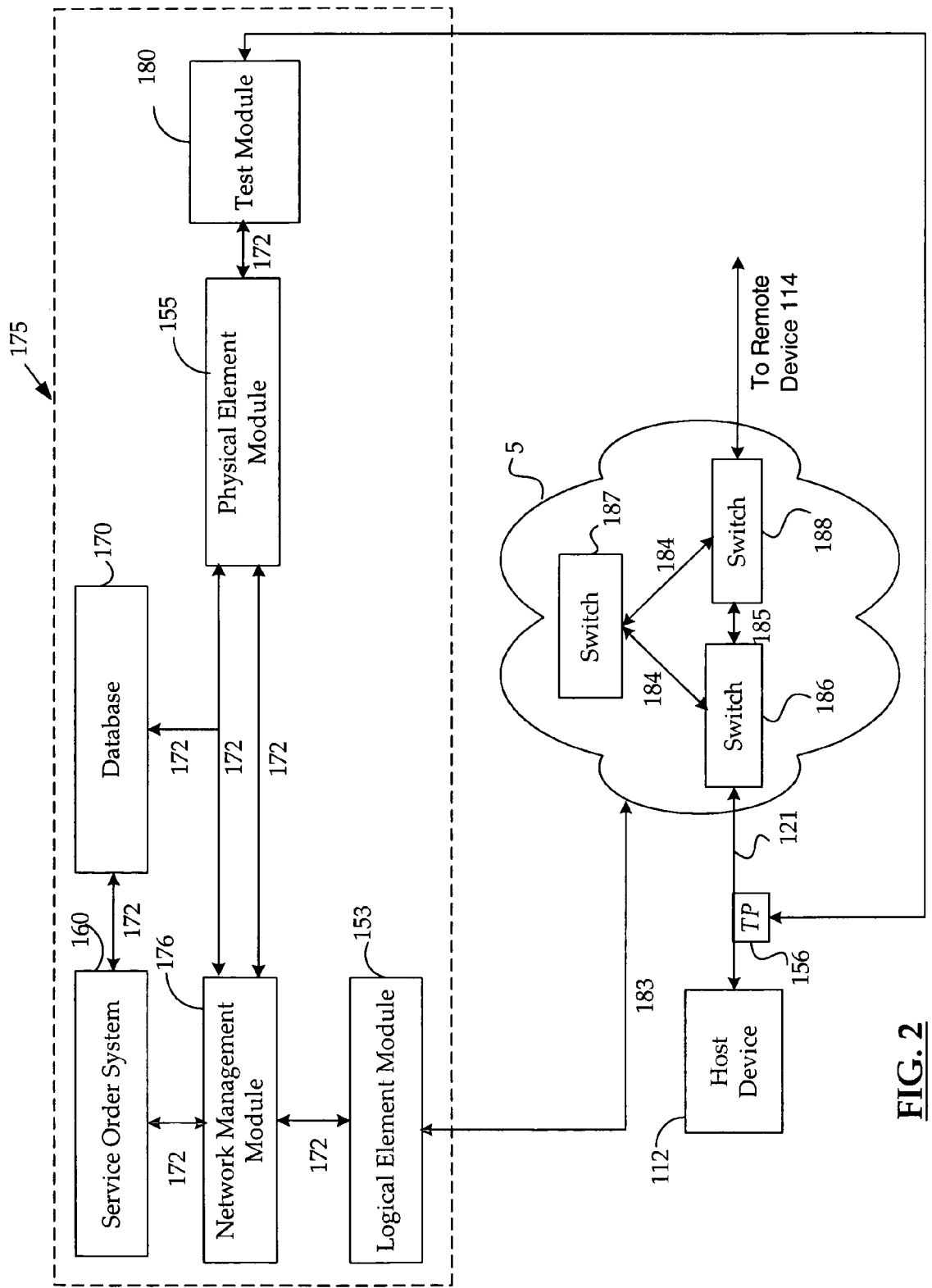
FIG. 2 illustrates a local access and transport area ("LATA") and a network management system which may be utilized to automatically identify a failure in a logical circuit in the data network of FIG. 1, according to an embodiment of the invention.

Turning now to FIG. 2, an illustrative data carrier (i.e., the LATA 5) and the network management system 175, contained in the data network described in FIG. 1 above, will now be described. As shown in FIG. 2, the LATA 5 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail below), in the network management system 175. In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 112 and 114 receive status information from the individual LATAs they are connected to in response to a status request sent in a special management frame or cell. The LMI status information may include, for example, whether or not the logical circuit is congested or whether or not the network circuit has failed. It should be understood that the parameters and the signaling mechanism discussed above are optional and that other parameters and mechanisms may also be utilized to obtain connection status information for a network circuit.

As discussed above in, the LATA 5 may be connected to the network management system 175 which, as shown in FIG. 2, includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit for the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches 186, 187, and 188 through management trunks 185. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information regarding logical circuits such as the logical identifier data. The logical identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for the physical circuit by communicating with test module 180, which interfaces with the physical connections via test access point 156. The test module 180 obtains the status of the physical circuit by transmitting "clean" test signals to test access point 156 which "loopback" the signals for detection by the test module 180. It should be understood that there may be multiple test access points on each of the physical connections for the physical circuit.

The network management system 175 further includes the network management module 176 which is in communication with the service order system 160, the network database 170, the logical element module 153, and the physical element module 155 through communications channels 172. The communications channels 172 may be on a LAN. The network management module 176 may consist of terminals (not shown), which may be part of a general-purpose computer system that displays a map-based GUI of the logical connections in data networks. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this application, which is expressly incorporated herein by reference. An illustrative network management module is the Broadband Network Management System® ("BBNMS") marketed by TELECORDIA™ TECHNOLOGIES, Inc. of Morristown, N.J.

It should be understood that in one embodiment, the network management system 175 may also be in communication with the LATA 15, the IEC 10, and the failover network 17.

Figure 3:
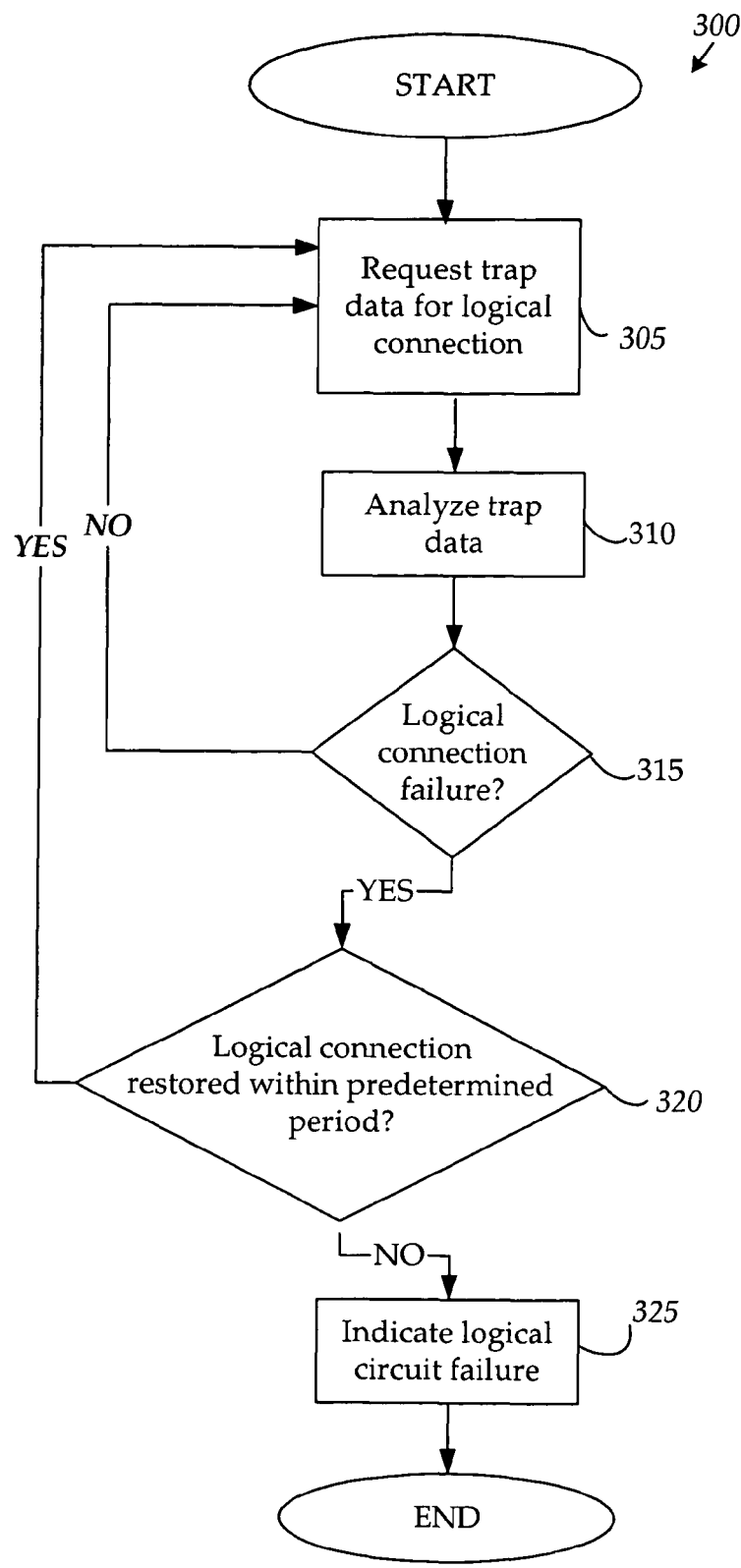
FIG. 3 illustrates a flowchart describing logical operations for automatically identifying a failure in a logical circuit in the data network of FIG. 1, according to an embodiment of the invention.

FIG. 3 illustrates a flowchart describing logical operations 300 for automatically identifying a failure in a logical circuit in the data network 2 of FIG. 1, according to an embodiment of the invention. The logical operations 300 begin at operation 305 where the network management module 176 communicates with the logical element module 153 to request trap data indicating the status of a logical connection making up the logical circuit in the data network 2. It should be understood that although the trap data is continuously generated by the switches in the data network 2 and then communicated to the logical element module 153 each time a change in status occurs, in this embodiment, the network management module 176 may be configured so that the trap data is only requested periodically (e.g., once every hour) so that system resources are conserved. It will be appreciated that in another embodiment of the invention, the trap data could be processed passively from the switches by the logical element module 153 (where the trap data is stored). The network management module 176, in communication with the logical element module 153, may then be configured to actively poll only those switches carrying logical circuits indicating trouble (e.g., dropped frames or cells) to further conserve system resources. Once the request for trap data is made, all of the trap data collected in the last time period (e.g., one hour) is communicated to the network management module 176 from the logical element module 153.

For example, in one embodiment, the network management module 176 may be configured to check the status of the NNI or logical connection 102 in the data network 2 by requesting the trap data generated by the switches 186, 187, and 188 in the LATA 5. It will be appreciated that in one embodiment, the network management module 176 may be configured to first request trap data for a logical connection on one end of a logical circuit (e.g., the host end) and then identify the logical connection for the other end of the logical circuit (e.g., the remote end) based on the logical identifier (i.e., the DLCI or VPI/VCI information) for the logical circuit. It will be appreciated that the network management module 176 may obtain the logical identifier by polling the logical element module 153. Once the logical identifier for the logical circuit has been obtained, the network management module 176 may then access the network database 170 to "lookup" the NNI or logical connection on the far end of the logical circuit and request the trap data for that logical connection.

After requesting trap data for a logical connection (or logical connections) in the data network 2 at operation 305, the logical operations 300 continue at operation 310 where the network management module 176 analyzes the received trap data and identifies a logical connection failure at operation 315. As discussed above in the description of FIG. 2, trap data indicating a logical connection failure may include status information indicating that a switch in the data network is discarding frames or cells. Such an event may occur, for example, when the maximum CIR or Bc (as specified in the DLCI of a frame in a frame relay network, for example) is exceeded. If at operation 315, it is determined that a logical connection failure has not occurred, the logical operations 300 then return to operation 305 where the network management module 176 again requests trap data from the logical element module 153 during the next predetermined period (e.g., the beginning of the next hour). If, however, at operation 315 it is determined that a logical connection failure has occurred, the logical operations continue from operation 315 to operation 320 where the network management module 176 waits a predetermined period (e.g., five minutes) to determine whether the failed logical connection has been restored (i.e., the communication of data over the logical connection has resumed). For example, in the data network 2 illustrated in FIG. 2, the "X" marking the logical connections 102 and 104 indicates that the logical connection is "down beyond" (i.e., not communicating data) the NNIs for the logical circuit in the LATAs 5 and 15.

If at operation 320, the network management module 176 determines that the failed logical connection has been restored, the logical operations 300 return to operation 305 where the network management module 176 again requests trap data from the logical element module 153 during the next predetermined period. If, however, at operation 320 the network management module 176 determines that the failed logical connection has not been restored during the predetermined wait period, the logical operations 300 continue to operation 325 where the network management module 176 indicates that the logical circuit has failed.

Once the network management module 176 has indicated a logical circuit failure it may initiate an automatic reroute procedure using the failover network 17. An illustrative method detailing rerouting logical circuit data over a failover network is presented in U.S. patent application Ser. No. 10/744,921, entitled "Method And System For Automatically Rerouting Logical Circuit Data In A Data Network," filed on Dec. 23, 2003, and assigned to the same assignee as this application, which is expressly incorporated herein by reference.

It will be appreciated that the embodiments of the invention described above provide for a method and system for automatically identifying a failure in a logical circuit in a data network. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for automatically identifying a failure in a logical circuit in a data network, the method comprising:
    polling first and second switches in the logical circuit of the data network based on a predetermined schedule to retrieve status information associated with a failure status of at least one of a first network-to-network interface or a second network-to-network interface, wherein the logical circuit connects a host device to a remote device via first and second local access and transport areas and an inter-exchange carrier, wherein the host device is in communication with the first local access and transport area, wherein the first local access and transport area is in communication with the inter-exchange carrier via the first switch in the first local access and transport area forming the first network-to-network interface, wherein the inter-exchange carrier is in communication with the second local access and transport area via the second switch in the second local access and transport area forming the second network-to-network interface, and wherein the second local access and transport area is in communication with the remote device; and
    identifying a failure of the logical circuit based on the status information without manual intervention, wherein identifying the failure of the logical circuit comprises determining if at least one frame has been discarded.

2. The method of claim 1, wherein polling the first and second switches in the first and second local access and transport areas comprises periodically requesting trap data stored at the first and second switches and not retrieved from the first and second switches until the polling.

3. The method of claim 1, wherein identifying the failure of the logical circuit comprises:
    analyzing the status information;
    if the status information indicates that the at least one of the first or second network-to-network interfaces is no longer communicating data, then determining that the at least one of the first or second network-to-network interfaces has failed;
    after determining that the at least one of the first or second network-to-network interfaces has failed, waiting a predetermined time period to determine whether the at least one of the first or second network-to-network interfaces has been restored; and if after the predetermined time period, the at least one of the first or second network-to-network interfaces has not been restored, indicating that the logical circuit has failed.

4. The method of claim 1 further comprising:
identifying a logical identifier for the logical circuit; and
based on the logical identifier, accessing a database to identify a first logical connection associated with the first network-to-network interface and a second logical connection associated with the second network-to-network interface.

5. The method of claim 4, wherein the logical identifier is a data link connection identifier (DLCI).

6. The method of claim 4, wherein the logical identifier is a virtual path/virtual circuit identifier (VPI/VCI).

7. The method of claim 1, wherein the logical circuit is a permanent virtual circuit.

8. The method of claim 1, wherein the logical circuit is a switched virtual circuit.

9. The method of claim 1, wherein the data network is a frame relay network.

10. The method of claim 1, wherein the data network is an asynchronous transfer mode (ATM) network.

11. The method of claim 1, further comprising rerouting data from the logical circuit to a failover circuit in response to identifying the failure of the logical circuit to bypass the first and second network-to-network interfaces and the inter-exchange carrier.

12. The method of claim 1, wherein the logical circuit includes a first variable communication path through the first local access and transport area, a second variable communication path through the second local access and transport area, a first fixed communication path between the first local access and transport area and the inter-exchange carrier, and a second fixed communication path between the inter-exchange carrier and the second local access and transport area.

13. A system for automatically identifying a logical circuit failure in a data network, the system comprising:
a first network device in a first local access and transport area forming a first network-to-network interface connecting the first local access and transport area to an inter-exchange carrier to establish a logical circuit connecting the first local access and transport area to a second local access and transport area via the inter-exchange carrier, the network device to collect status information indicative of a failure status of the first network-to-network interface;
a logical element module in communication with the first network device to receive the status information, the logical element module further in communication with a second network device of the second local access and transport area, the second network device forming a second network-to-network interface connecting the inter-exchange carrier to the second local access and transport area; and
a network management module, in communication with the logical element module, to:
periodically monitor the logical circuit for the status information, wherein periodically monitoring the logical circuit comprises polling only switches carrying logical circuits indicating a problem;
periodically retrieve the status information through the polling when the logical circuit indicates a problem; and identify a failure of the logical circuit based on the status information without manual intervention.

14. The system of claim 13, wherein the network management module identifies the failure of the logical circuit by:
analyzing the status information;
if the status information indicates that the first network-to-network interface is no longer communicating data, determining that the first network-to-network interface has failed;
after determining that the first network-to-network interface has failed, waiting a predetermined time period to determine whether the first network-to-network interface has been restored; and
if after the predetermined time period, the first network-to-network interface has not been restored, indicating that the logical circuit has failed.

15. The system of claim 13, further comprising a database for storing a logical identifier for the logical circuit.

16. The system of claim 15, wherein the network management module is operative to access the database and is further operative to:
retrieve the logical identifier for the logical circuit; and
based on the logical identifier, identify each of the first and second network-to-network interfaces in the logical circuit.

17. The system of claim 15, wherein the logical identifier is a data link connection identifier (DLCI).

18. The system of claim 15, wherein the logical identifier is a virtual path/virtual circuit identifier (VPI/VCI).

19. The system of claim 13, wherein the logical circuit is a permanent virtual circuit.

20. The system of claim 13, wherein the logical circuit is a switched virtual circuit.

21. The system of claim 13, wherein the first and second network-to-network interfaces form a frame relay network.

22. The system of claim 13, wherein the first and second network-to-network interfaces form an asynchronous transfer mode (ATM) network.

23. The system of claim 13, wherein the network management module is further to initiate a reroute procedure to reroute data from the logical circuit to a failover circuit in response to identifying the failure of the logical circuit to bypass the first and second network-to-network interfaces and the inter-exchange carrier.

24. The system of claim 13, wherein the logical circuit includes a first variable communication path through the first local access and transport area, a second variable communication path through the second local access and transport area, a first fixed communication path between the first local access and transport area and the inter-exchange carrier, and a second fixed communication path between the inter-exchange carrier and the second local access and transport area.

25. A method for automatically identifying a failure in a logical circuit in a data network, the method comprising:
after identifying the existence of a problem in the logical circuit, polling a first network device of the logical circuit to retrieve first status information, the logical circuit connecting a host device to a remote device via first and second local access and transport areas and an inter-exchange carrier, the first network device forming a first network-to-network interface connecting the first local access and transport area to the inter-exchange carrier, and the first status information indicative of a failure status of the first network-to-network interface;
after confirming a failure in the first network-to-network interface based on the first status information, determining whether the first network-to-network interface has been restored after waiting a predetermined duration; and when the first network-to-network interface has not been restored after the predetermined duration, indicating that the logical circuit has failed; and after indicating that the logical circuit has failed, rerouting data via a failover network in communication with the first and second local access and transport areas to bypass the first network-to-network interface, the inter-exchange carrier, and a second network-to-network interface connecting the inter-exchange carrier to the second local access and transport area.

26. The method of claim 25, wherein the failure of the logical circuit indicates that the logical circuit is no longer communicating data.

27. The method of claim 25, wherein the polling of the first network device is performed by a network management system in communication with the first network device and a second network device in the second local access and transport area, wherein the network management system further polls the second network device for second status information indicative of a failure status of the second network-to-network interface, and wherein the network management system is not part of the logical circuit.

28. The method of claim 25, wherein the logical circuit includes a first variable communication path through the first local access and transport area, a second variable communication path through the second local access and transport area, a first fixed communication path between the first local access and transport area and the inter-exchange carrier, and a second fixed communication path between the inter-exchange carrier and the second local access and transport area.

* * * * *